(12) United States Patent
Luo et al.

(10) Patent No.: US 8,958,393 B2
(45) Date of Patent: Feb. 17, 2015

(54) METHOD AND APPARATUS FOR ENHANCED USER EQUIPMENT-CONTROLLED HANDOVER

(75) Inventors: Xiliang Luo, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 692 days.

(21) Appl. No.: 12/536,956

(22) Filed: Aug. 6, 2009

(65) Prior Publication Data

US 2010/0034173 A1 Feb. 11, 2010

Related U.S. Application Data

(60) Provisional application No. 61/087,948, filed on Aug. 11, 2008.

(51) Int. Cl.
*H04W 4/00* (2009.01)

(52) U.S. Cl.
USPC .......................................................... 370/332

(58) Field of Classification Search
CPC ....................................................... H04W 4/00
USPC ................................................. 370/329–332
See application file for complete search history.

(56) References Cited

U.S. PATENT DOCUMENTS

| 5,542,097 A * | 7/1996 | Ward et al. ..................... 455/437 |
| 2004/0097234 A1* | 5/2004 | Rajkotia et al. ............... 455/442 |
| 2005/0009532 A1* | 1/2005 | Cuffaro et al. ............. 455/452.2 |
| 2007/0015511 A1* | 1/2007 | Kwun et al. ................... 455/436 |
| 2007/0155391 A1 | 7/2007 | Kang et al. |
| 2009/0053994 A1* | 2/2009 | Senarath et al. ............. 455/11.1 |
| 2009/0131063 A1* | 5/2009 | Yi et al. ........................ 455/450 |

FOREIGN PATENT DOCUMENTS

| EP | 1740007 | 1/2007 |
| WO | WO2008116027 | 9/2008 |

OTHER PUBLICATIONS

Ericsson: "RSRP/E-UTRA carrier RSSI for Mobility Support in E-UTRAN" 3GPP Draft; R1-071598, 3rd Generation Partnership Project (3GPP), Mobile Competence Centre ; 650, Route Des Lucioles ; F-06921 Sophia-Antipolis Cedex ; France, vol. RAN WG1, no. St. Julian; Apr. 3, 2007, XP050105528 [retrieved on Apr. 3, 2007] the whole document.
International Search Report and Written Opinion—PCT/US2009/053343—ISA/EPO—Dec. 1, 2009.

* cited by examiner

*Primary Examiner* — Sulaiman Nooristany

(57) ABSTRACT

Certain aspects of the present disclosure propose methods for enhanced handover procedures that are controlled by either the user equipment (UE) or the serving evolved node-B (eNB). The methods take into account the qualities of both the reverse and forward communication links between the UE and the neighboring eNBs in selecting a target eNB for handover.

12 Claims, 10 Drawing Sheets

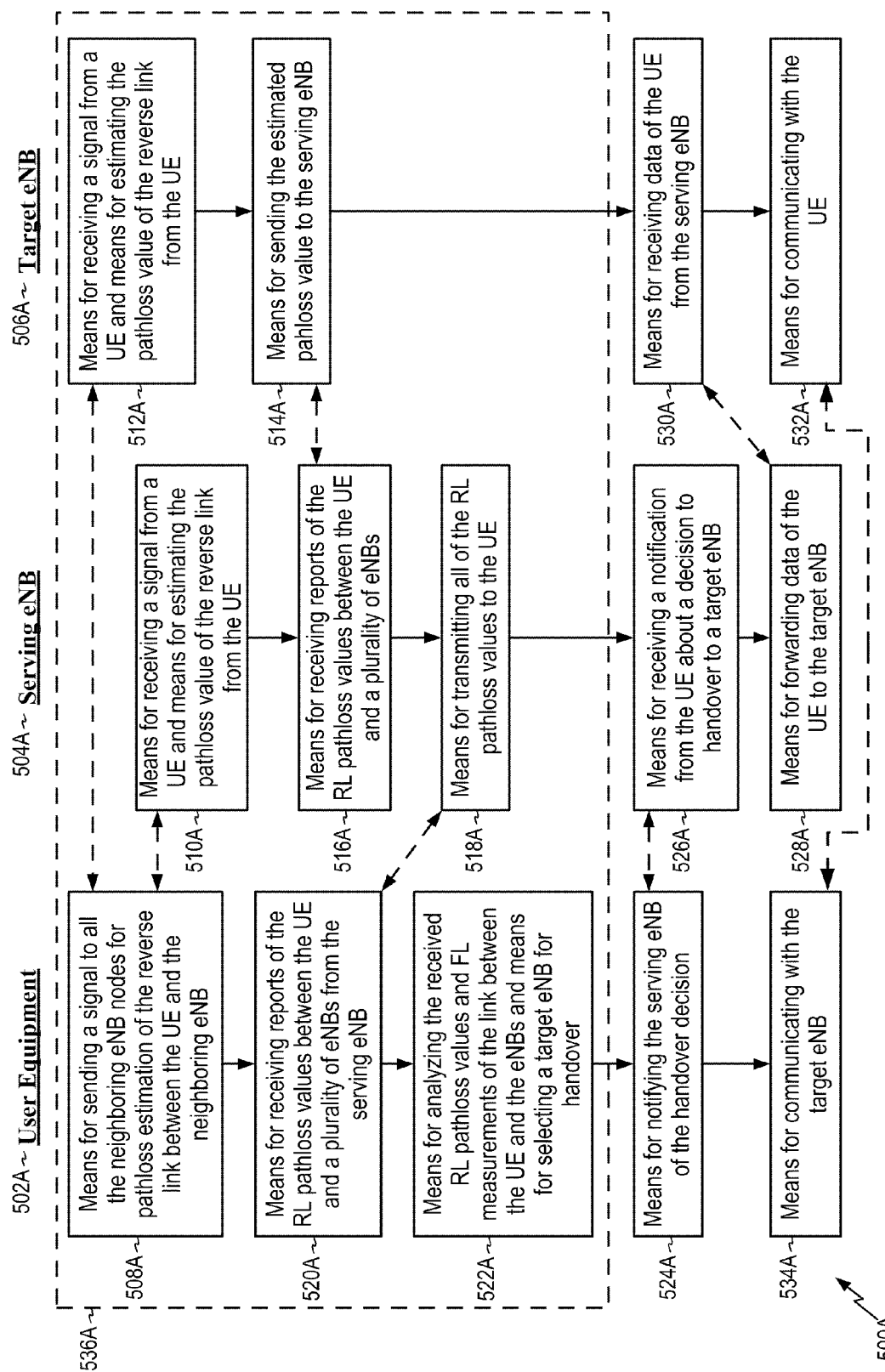

METHOD AND APPARATUS FOR ENHANCED USER EQUIPMENT-CONTROLLED HANDOVER

CLAIM OF PRIORITY UNDER 35 U.S.C. §119

This application claims benefit of U.S. Provisional Patent Application Ser. No. 61/087,948 filed Aug. 11, 2008, and assigned to the assignee hereof and hereby expressly incorporated by reference herein.

TECHNICAL FIELD

Certain aspects of the present disclosure generally relate to wireless communication and, more particularly, to techniques for enhanced handover from a serving base station or evolved Node B (eNB) to a target eNB, wherein the handover is controlled either by a user equipment (UE) or by the serving eNB.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the mobile stations, and the reverse link (or uplink) refers to the communication link from the mobile stations to the base stations. This communication link may be established via a single-in-single-out, multiple-in-single-out or a multiple-in-multiple-out (MIMO) system.

A user equipment (UE) (i.e., a mobile station) may need to handover from a serving evolved-Node B (eNB) (i.e., base station) to a target eNB for a plurality of reasons, such as experiencing a weak communication link between the UE and the serving eNB due to the variations in channel quality by time, leaving a cell that is serviced by an eNB and entering a new cell, etc. The handover may be controlled by the UE or by the serving eNB. If the UE initiates the handover, a UE-controlled handover is performed. If the serving eNB initiates the handover, a network-controlled handover is performed.

In LTE standard, a UE-controlled handover is used only when the communication link to the serving eNB is in failure. The UE-controlled handover in LTE has a few drawbacks, such as large service interruption time before handover, possibility of a weak communication channel between the UE and a target eNB even after the handover, etc.

Therefore, there is a need in the art for an efficient handover mechanism from a serving eNB to a target eNB that takes into account the quality of the links between the UE and the neighboring eNBs that are candidates for the handover.

SUMMARY

Certain aspects provide a method for wireless communications by a user equipment (UE). The method generally includes sending a signal to a plurality of neighboring evolved Node-Bs (eNBs), wherein the signal is used for estimation of path loss in a reverse link (RL) between the UE and the neighboring eNBs, receiving values for RL path loss between the UE and the plurality of neighboring eNBs, making a decision to handover to a target eNB selected from the plurality of neighboring eNBs by analyzing the received RL path loss values and forward link measurements between the UE and the neighboring eNBs, and sending a notification regarding the handover decision.

Certain aspects provide a method for wireless communications by a serving evolved Node-B (eNB). The method generally includes estimating path loss value of a reverse link between a user equipment (UE) and the serving eNB based on a signal received from a user equipment (UE), and receiving path loss values of reverse links between the UE and a plurality of neighbor eNBs, wherein the estimated path loss value and received path loss values are used to make a decision to handover the UE from the serving eNB to one of the neighbor eNBs.

Certain aspects provide an apparatus for wireless communications by a user equipment. The apparatus generally includes logic for sending a signal to a plurality of neighboring evolved Node-Bs (eNBs), wherein the signal is used for estimation of path loss in a reverse link (RL) between the UE and the neighboring eNBs, logic for receiving values for RL path loss between the UE and the plurality of neighboring eNBs, logic for making a decision to handover to a target eNB selected from the plurality of neighboring eNBs by analyzing the received RL path loss values and forward link measurements between the UE and the neighboring eNBs, and logic for sending a notification regarding the handover decision.

Certain aspects provide an apparatus for wireless communications by a serving evolved Node-B. The apparatus generally includes logic for estimating path loss value of a reverse link between a user equipment (UE) and the serving eNB based on a signal received from a user equipment (UE), and logic for receiving path loss values of reverse links between the UE and a plurality of neighbor eNBs, wherein the estimated path loss value and received path loss values are used to make a decision to handover the UE from the serving eNB to one of the neighbor eNBs.

Certain aspects provide an apparatus for wireless communications by a user equipment. The apparatus generally includes means for sending a signal to a plurality of neighboring evolved Node-Bs (eNBs), wherein the signal is used for estimation of path loss in a reverse link (RL) between the UE and the neighboring eNBs, means for receiving values for RL path loss between the UE and the plurality of neighboring eNBs, means for making a decision to handover to a target eNB selected from the plurality of neighboring eNBs by analyzing the received RL path loss values and forward link measurements between the UE and the neighboring eNBs, and means for sending a notification regarding the handover decision.

Certain aspects provide an apparatus for wireless communications by a serving evolved Node-B. The apparatus generally includes means for estimating path loss value of a reverse link between a user equipment (UE) and the serving eNB based on a signal received from a user equipment (UE), and means for receiving path loss values of reverse links between the UE and a plurality of neighbor eNBs, wherein the estimated path loss value and received path loss values are used to make a decision to handover the UE from the serving eNB to one of the neighbor eNBs.

Certain aspects provide a computer-program product for wireless communications by a user equipment, comprising a computer-readable medium having instructions stored thereon, the instructions being executable by one or more processors. The instructions generally include instructions for sending a signal to a plurality of neighboring evolved Node-Bs (eNBs), wherein the signal is used for estimation of path loss in a reverse link (RL) between the UE and the neighboring eNBs, instructions for receiving values for RL path loss between the UE and the plurality of neighboring eNBs, instructions for making a decision to handover to a target eNB selected from the plurality of neighboring eNBs by analyzing the received RL path loss values and forward link measurements between the UE and the neighboring eNBs, and instructions for sending a notification regarding the handover decision.

Certain aspects provide a computer-program product for wireless communications by a serving evolved Node-B (eNB), comprising a computer-readable medium having instructions stored thereon, the instructions being executable by one or more processors. The instructions generally include instructions for estimating path loss value of a reverse link between a user equipment (UE) and the serving eNB based on a signal received from a user equipment (UE), and instructions for receiving path loss values of reverse links between the UE and a plurality of neighbor eNBs, wherein the estimated path loss value and received path loss values are used to make a decision to handover the UE from the serving eNB to one of the neighbor eNBs.

Certain aspects provide an apparatus for wireless communications by a user equipment. The apparatus generally includes at least one processor configured to send a signal to a plurality of neighboring evolved Node-Bs (eNBs), wherein the signal is used for estimation of path loss in a reverse link (RL) between the UE and the neighboring eNBs, receive values for RL path loss between the UE and the plurality of neighboring eNBs, make a decision to handover to a target eNB selected from the plurality of neighboring eNBs by analyzing the received RL path loss values and forward link measurements between the UE and the neighboring eNBs, send a notification regarding the handover decision, and a memory coupled to the processor.

Certain aspects provide an apparatus for wireless communications by a serving evolved Node-B (eNB). The apparatus generally includes at least one processor configured to estimate path loss value of a reverse link between a user equipment (UE) and the serving eNB based on a signal received from a user equipment (UE), receive path loss values of reverse links between the UE and a plurality of neighbor eNBs, wherein the estimated path loss value and received path loss values are used to make a decision to handover the UE from the serving eNB to one of the neighbor eNBs, and a memory coupled to the processor.

BRIEF DESCRIPTION OF THE DRAWINGS

So that the manner in which the above recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 5A illustrates example components capable of performing the operations illustrated in FIG. 5.

DETAILED DESCRIPTION

The techniques described herein may be used for various wireless communication networks, such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards.

A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA) utilizes single carrier modulation and frequency domain equalization. SC-FDMA has similar performance and essentially the same overall complexity as those of an OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. SC-FDMA is currently a working assumption for uplink multiple access scheme in 3GPP Long Term Evolution (LTE), or Evolved UTRA.

Figure 1:
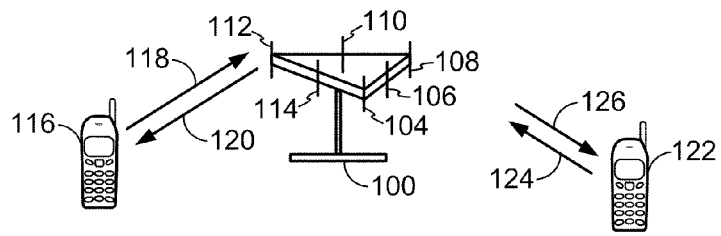
FIG. 1 illustrates a multiple access wireless communication system, in accordance with certain aspects of the present disclosure.

Referring to FIG. 1, a multiple access wireless communication system according to one aspect is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a frequency division duplex (FDD) system, communication links 118, 120, 124 and 126 may use different frequencies for communication. For example, forward link 120 may use a different frequency than the frequency used by the reverse link 118.

Each group of antennas and/or the area in which they are designed to communicate is often referred to as a sector of the access point. In an aspect, antenna groups each are designed to communicate to access terminals in a sector of the areas covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as a base station, a Node B, or some other terminology. An access terminal may also be called a mobile station, a user equipment, a wireless communication device, terminal, access terminal or some other terminology.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system may support time division duplex (TDD) or frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

Figure 2:
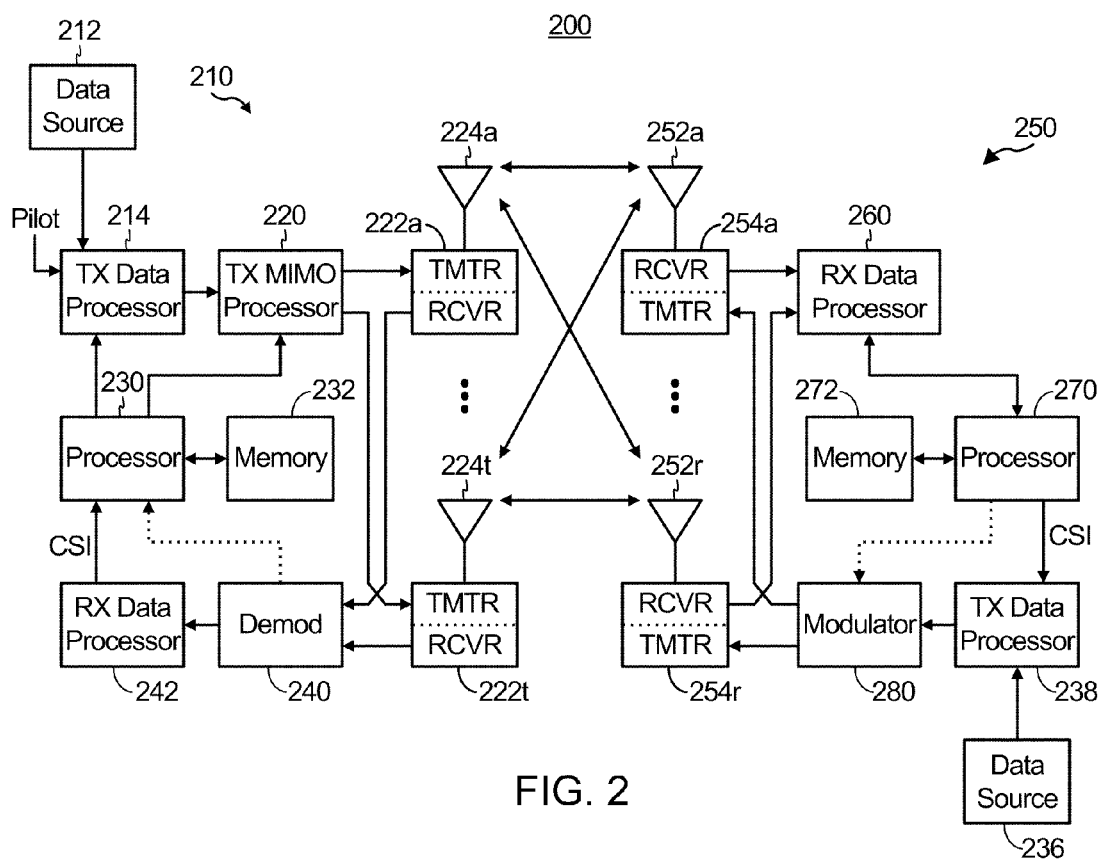
FIG. 2 illustrates a block diagram of a communication system, in accordance with certain aspects of the present disclosure.

FIG. 2 is a block diagram of an aspect of a transmitter system 210 (also known as the access point) and a receiver system 250 (also known as access terminal) in a MIMO system 200. At the transmitter system 210, traffic data for a number of data streams is provided from a data source 212 to a transmit (TX) data processor 214.

In an aspect, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., binary phase shift keying (BPSK), quadrature phase shift keying (QPSK), M-PSK, or quadrature amplitude modulation (M-QAM)) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, de-interleaves, and decodes each detected symbol stream to recover the traffic data for the data stream. The processing by RX data processor 260 is complementary to that performed by TX MIMO processor 220 and TX data processor 214 at transmitter system 210. Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 calculates the beamforming weights and processes the extracted message.

Method and Apparatus for Enhanced User Equipment-Controlled Handover

A user equipment (UE) may need to handover from a serving eNB to a target eNB for a plurality of reasons, such as experiencing a weak communication link between the UE and the serving eNB due to the variations in channel quality, leaving a cell that is serviced by an eNB and entering a new cell, etc. The handover may be controlled by the UE or by the serving eNB. If the UE initiates the handover, a UE-controlled handover is performed. If the serving eNB initiates the handover, a network-controlled handover is performed.

Figure 3:
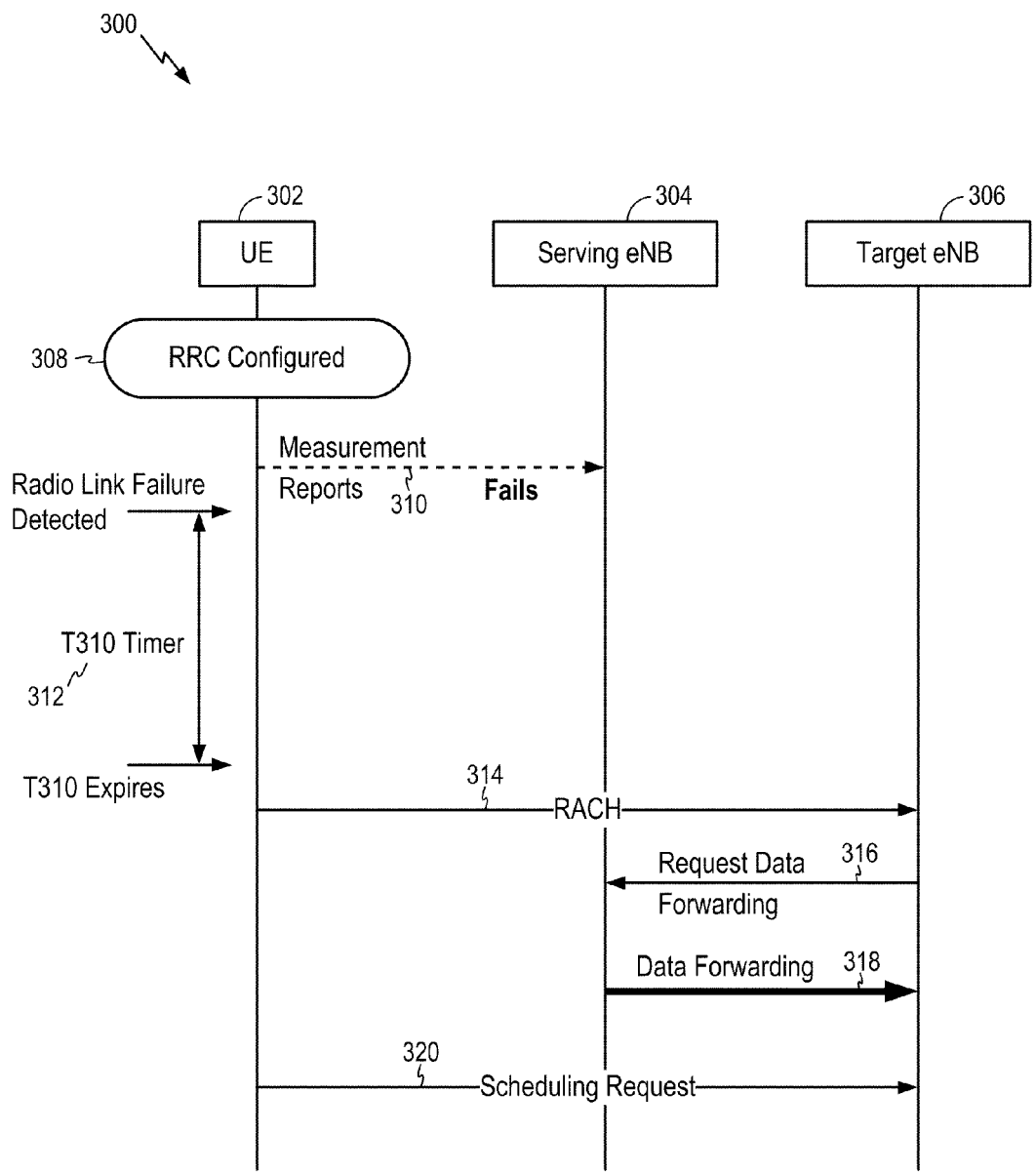
FIG. 3 illustrates an example flow diagram of User Equipment (UE)-controlled handover in the Long Term Evolution (LTE) standard.

FIG. 3 illustrates an example flow diagram 300 of a UE-controlled handover in release 8 of the LTE standard. A User Equipment (UE) 302 is configured by a radio resource controller (RRC) 308. The UE sends the measurement of its forward link (FL) parameters to the serving eNB 304. When the radio link failure is detected, the UE starts a T310 timer 312 and waits until T310 expires. Then, the UE sends a request 314 to a target eNB through the random access channel for handover. Upon receiving the handover request from the UE, the target eNB requests data forwarding 316 from the serving eNB 304. In response, the serving eNB forwards 318 the context associated with the UE to the target eNB. Then, the UE sends a scheduling request 320 to the target eNB and continues communicating with the target eNB.

The above UE-controlled handover in the LTE standard is used only when the communication link to the serving eNB is in failure. The UE-controlled handover in LTE has a few drawbacks. First, the target eNB may not be prepared to establish a new connection with the UE that is requesting a handover. Second, there could be a large service interruption time before the UE is allowed to request for handover. Third, the UE chooses a target handover without any knowledge of the quality of the reverse communication link from the UE to the target eNB; therefore, the communication channels to the target eNB may be weak.

Figure 4:
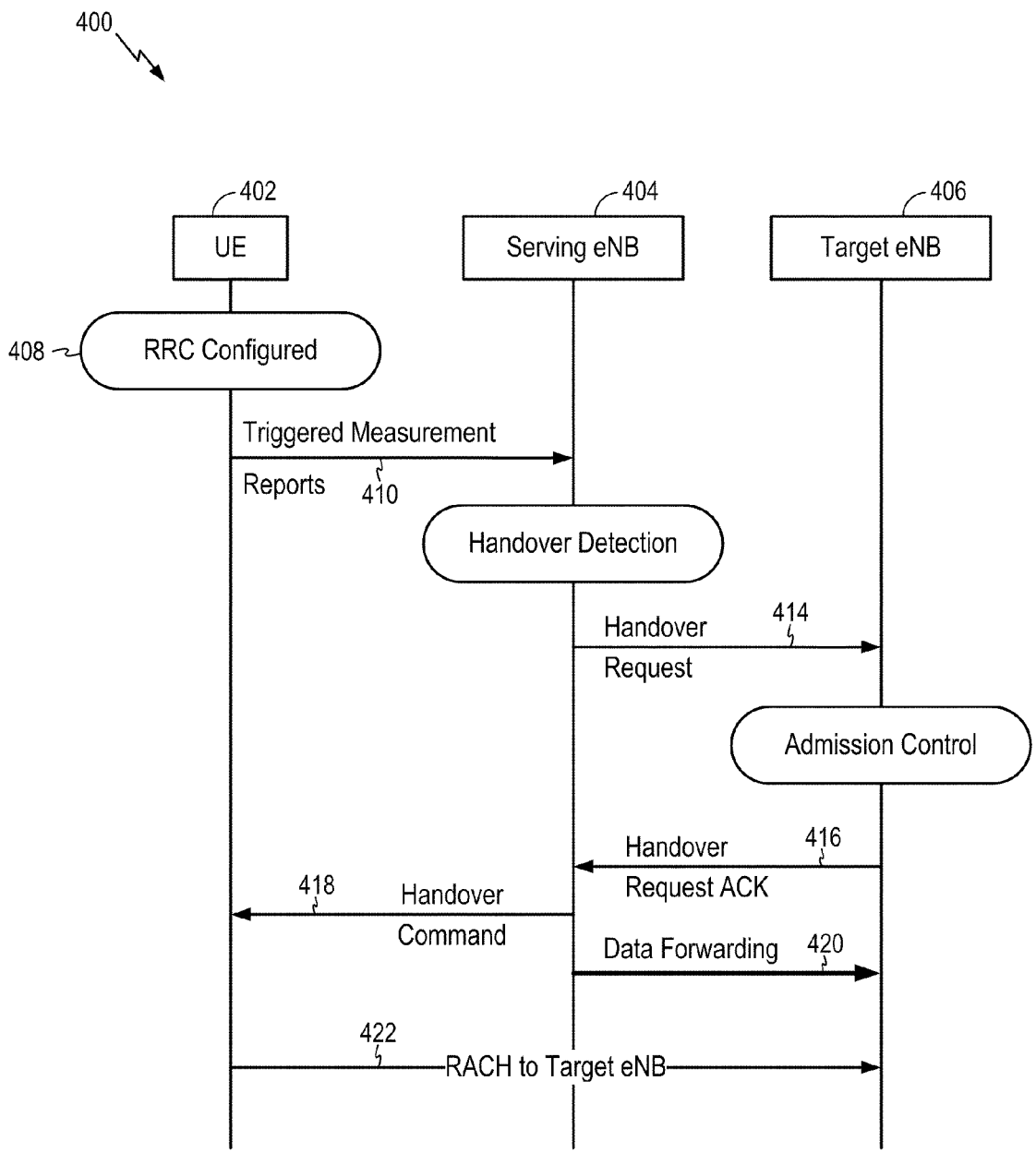
FIG. 4 illustrates an example flow diagram of a network-controlled handover in the LTE standard.

FIG. 4 illustrates an example flow diagram 400 of a network-controlled handover in the LTE standard. A User Equipment (UE) 402 is configured by a radio resource controller 408. The UE sends Triggered Measurement Reports 410 to the serving eNB 404. The serving eNB decides if the UE should handover to a different eNB or not. If yes, the serving eNB sends a handover request message 414 to a target eNB 406. After admission control, the target eNB sends an acknowledgement 416 message to the serving eNB. Upon receiving the acknowledgement, the serving eNB sends a handover command 418 to the UE. The serving BS also forwards 420 the data associated with the UE to the target eNB. The UE sends a request through the random access channel (RACH) 422 to the target eNB and continues communicating with the target eNB.

The handover mechanisms in the LTE standard do not take into account the quality of the reverse communication links from the UE to the target eNB. Certain aspects of the present disclosure, present enhanced handover techniques that utilize the information about the quality of both the reverse and forward communication links between the UE and a plurality of eNBs in the vicinity of the UE to select a target eNB for handover.

Figure 5:
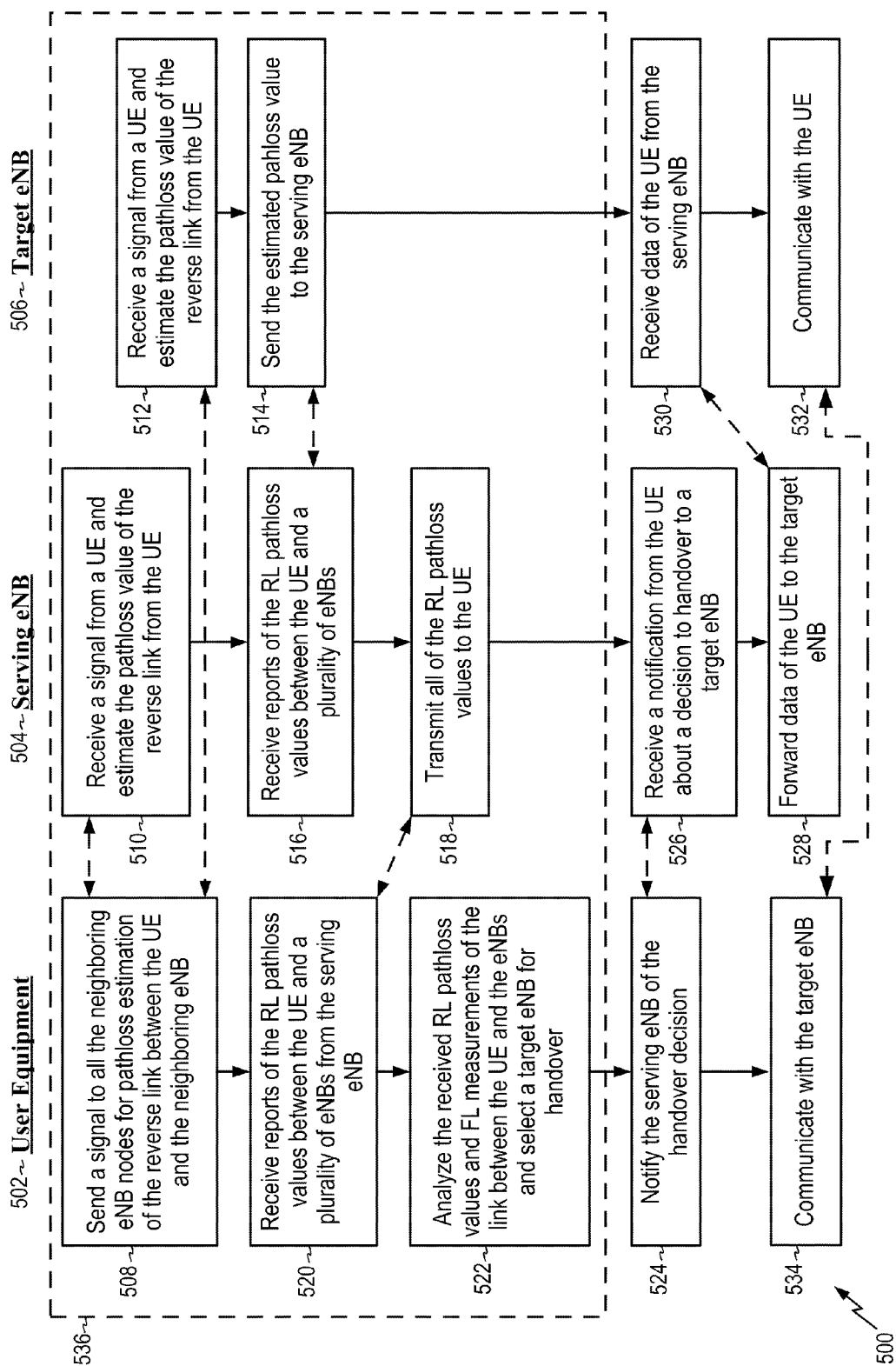
FIG. 5 illustrates example operations for an enhanced UE-controlled handover mechanism, in accordance with certain aspects of the present disclosure.

FIG. 5 illustrates example operations 500 for an enhanced UE-controlled handover mechanism, in accordance with certain aspects of the present disclosure. At 508, a UE 502 sends a signal to all the neighboring eNBs for path loss estimation of the reverse link between the UE and the neighboring eNB. At 510, the serving eNB 504 receives a signal from the UE and estimates the path loss value of the reverse link (RL) from the UE. At 512, all the neighboring eNBs including a target eNB 506 receive a signal from a UE and estimate the path loss values of the reverse links from the UE.

At 514, the neighboring eNB nodes send the estimated path loss values to the serving eNB. At 516, the serving eNB receives reports of the RL path loss values between the UE and a plurality of neighboring eNBs. At 518, the serving eNB transmits the RL path loss values to the UE. At 520, the UE receives the values of RL path loss for a plurality of eNBs from the serving eNB. At 522, the UE analyzes the received RL path loss values and FL measurements of the link between the UE and the eNBs and selects a target eNB for handover.

For certain aspects of the present disclosure, there may be at least two options for communicating the handover decision to the serving eNB and the target eNB. In the first option, At 524, the UE notifies the serving eNB of the handover decision. At 526, the serving eNB receives a notification from the UE about a decision to handover to a target eNB. At 528, the serving eNB forwards data of the UE to the target eNB. At 530, the target eNB receives data of the UE from the serving eNB. At 532-534, the target eNB and the UE start communicating with each other.

Figure 5B:
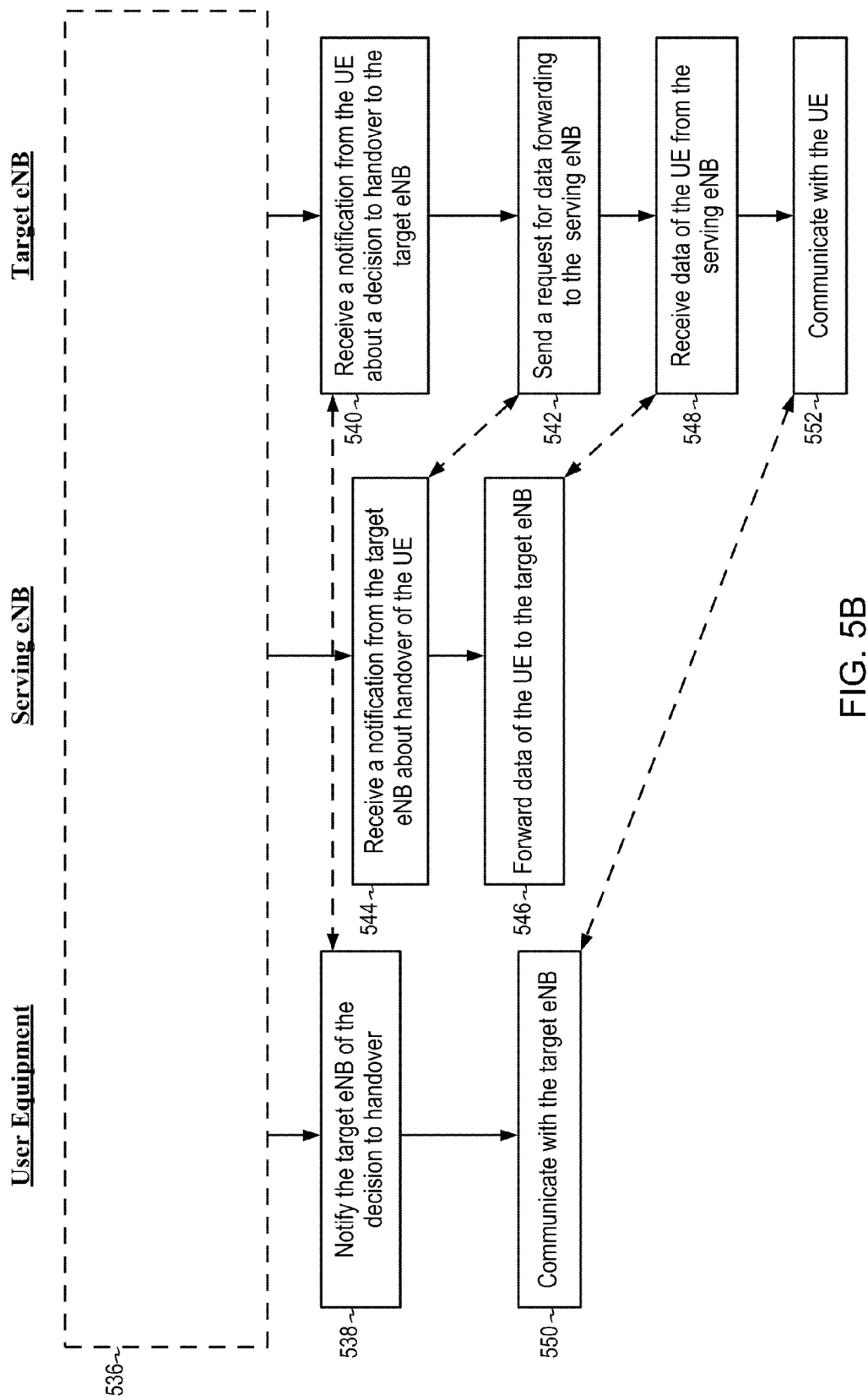
FIG. 5B illustrates example operations for an enhanced UE-controlled handover mechanism, in accordance with certain aspects of the present disclosure.

In the second option as illustrated in FIG. 5B, all the initial steps included in the box 536 are similar to the first option of the enhanced UE-controlled handover mechanism. In addition, at 538, the UE notifies the target eNB of the decision to handover. At 540, the target eNB receives a notification from the UE about a decision to handover to the target eNB. At 542, the target eNB sends a request for data forwarding to the serving eNB. At 544, the serving eNB receives a notification from the target eNB about handover of the UE. At 546, the serving eNB forwards data of the UE to the target eNB. At 548, the target eNB receives data of the UE from the serving eNB. At 550-552, the UE and the target eNB continue communicating with each other.

Figure 6:
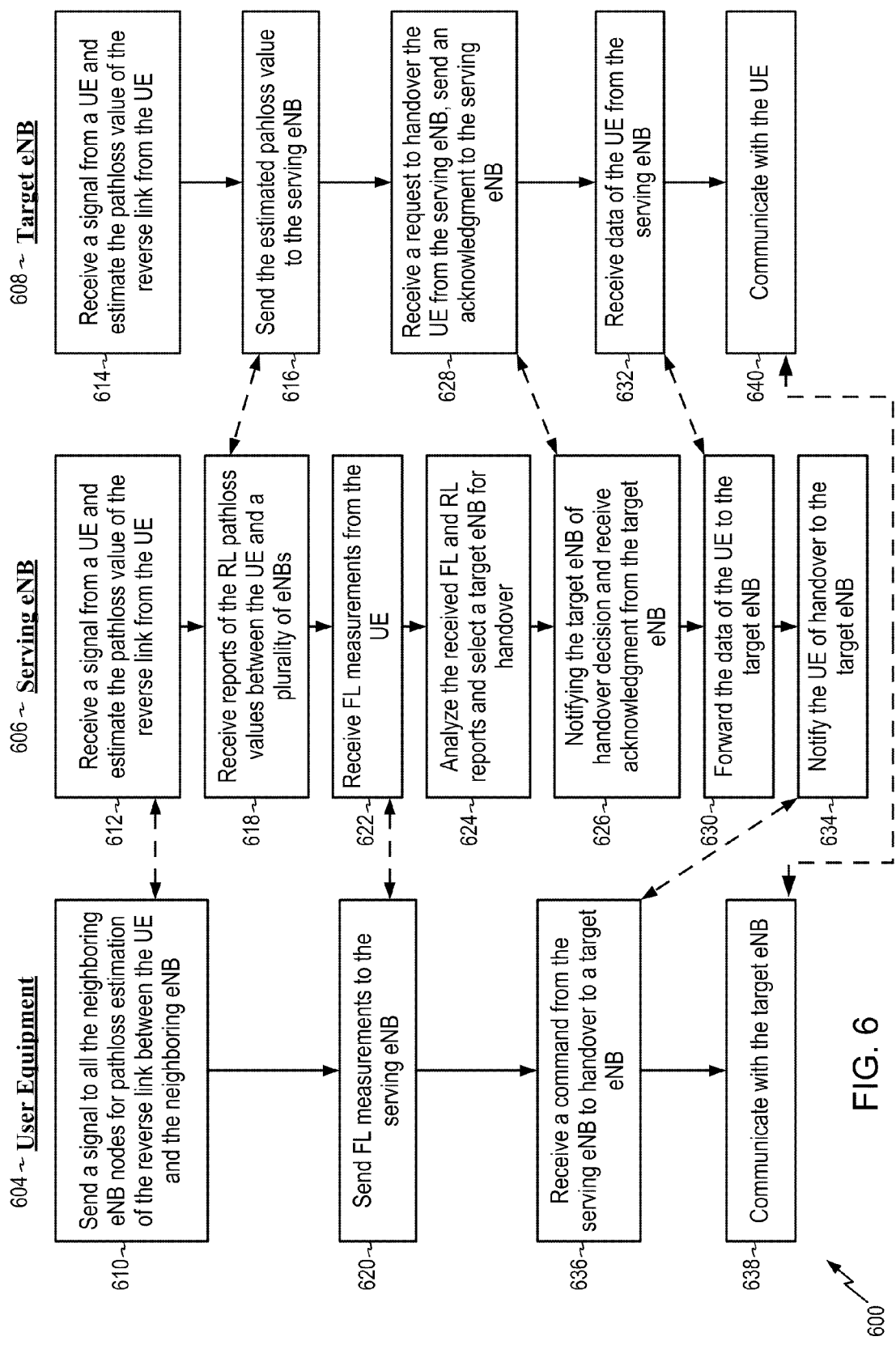
FIG. 6 illustrates example operations for an enhanced network-controlled handover mechanism, in accordance with certain aspects of the present disclosure.

FIG. 6 illustrates example operations 600 for an enhanced network-controlled handover mechanism, in accordance with certain aspects of the present disclosure. At 610, a UE 604 sends a signal to all the neighboring eNB nodes for path loss estimation of the reverse link between the UE and the neighboring eNB. At 612, the serving eNB 606 receives a signal from a UE and estimates the path loss of the reverse link from the UE. At 614, all the neighboring eNBs including a target eNB 608 receive a signal from the UE and estimate the path loss values of the reverse links from the UE.

At 616, the neighboring eNBs send the estimated path loss values to the serving eNB. At 618, the serving eNB receives the values of the RL path loss between the UE and a plurality of eNB nodes. At 620, the UE measures the forward link (FL) parameters between the UE and the eNBs and sends the FL measurements to the serving eNB. At 622, the serving eNB receives FL measurements from the UE. At 624, the serving eNB analyzes the received FL and RL values and selects a target eNB for handover. At 626, the serving eNB notifies the target eNB of the handover decision and receives acknowledgement from the target eNB. At 628, the target eNB receives a request to handover the UE from the serving eNB and sends an acknowledgement message to the serving eNB.

At 630, the serving eNB forwards the data of the UE to the target eNB. At 632, the target eNB receives data of the UE from the serving eNB. At 634, the serving eNB notifies the UE of handover to the target eNB. At 636, the UE receives a command from the serving eNB to handover to a target eNB. At 638-640, the UE and the target eNB start communicating with each other.

Figure 7:
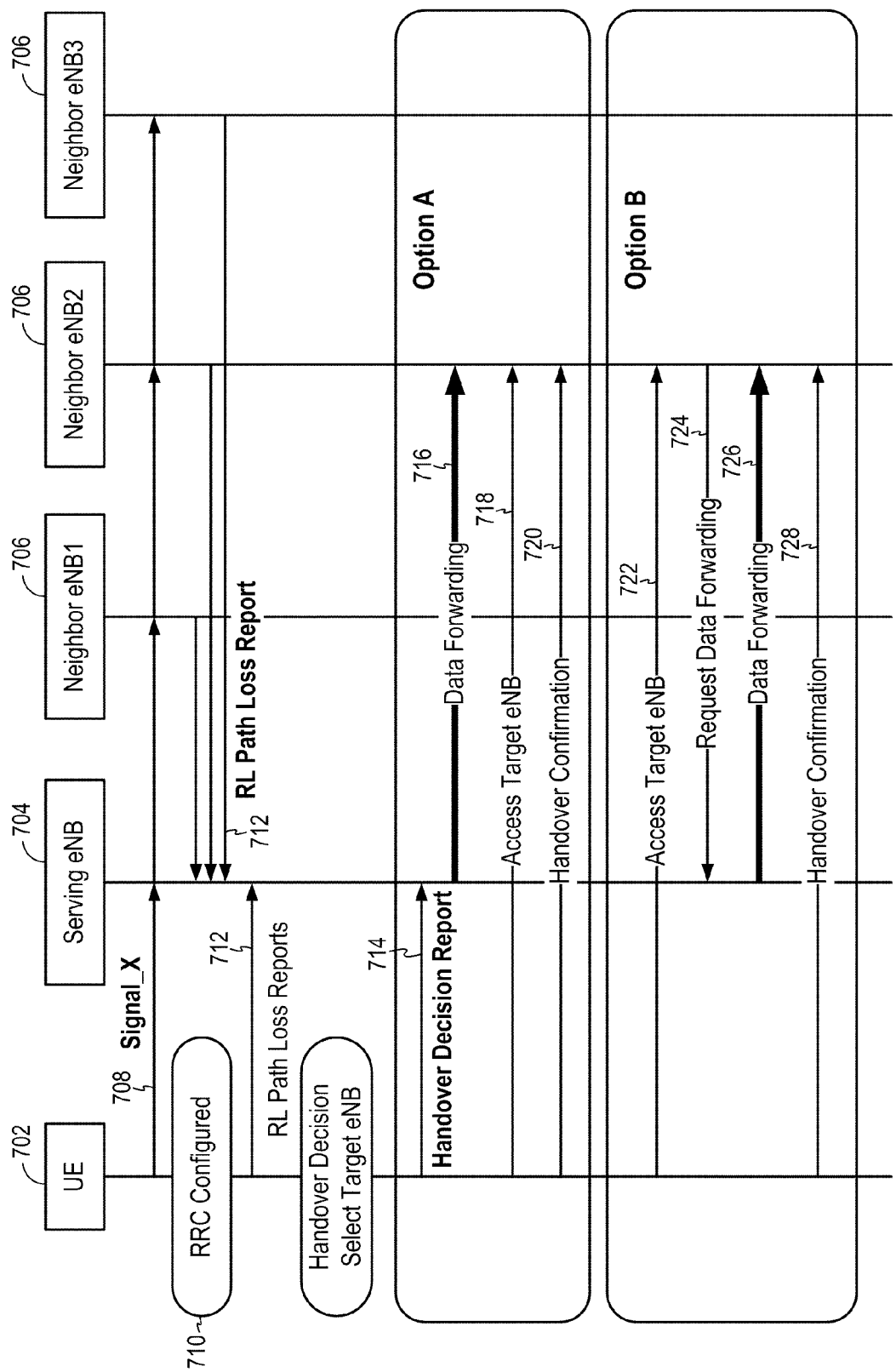
FIG. 7 illustrates an example flow diagram of an enhanced UE-controlled handover, in accordance with certain aspects of the present disclosure.

FIG. 7 illustrates an example flow diagram of an enhanced UE-controlled handover, in accordance with certain aspects of the present disclosure. A UE 702 sends a special signal, Signal_X 708, to all the neighboring eNBs that can hear this signal. The radio resource controller (RRC) 710 may determine time of the transmission of Signal_X. The neighboring eNBs 706 that are able to detect Signal_X estimate their reverse link path loss values and report the estimated path loss values 712 to the serving eNB 704.

The serving eNB forwards the RL path loss values of all the neighboring eNBs to the UE. When the channel between the UE and the serving eNB deteriorates, the UE selects one of the neighboring eNBs as a target eNB for handover. The target eNB is selected such that it has the best communication links based on the FL measurements at the UE and the RL path loss values of the neighboring eNBs that are received from the serving eNB.

When the UE selects the target eNB for handover, there could be two options for communicating the decision to the serving eNB and the target eNB.

For certain aspects, in option A, the UE sends a notification 714 to the serving eNB about its decision to handover to the target eNB 706. The serving eNB forwards the data 716 associated with the UE to the target eNB. The UE accesses 718 the target eNB and sends a confirmation 720 of the handover to the target eNB.

For certain aspects, the UE accesses 722 the target eNB to notify it about the decision to handover from the serving eNB to the target eNB. The target eNB sends a request for data forwarding 724 to the serving eNB 704. The serving eNB forwards 726 the data associated with the UE to the target eNB. The target eNB receives a confirmation 728 of the handover from the UE.

For certain aspects of the present disclosure, the Signal_X, which is transmitted by the UE, may contain information about the identity of the UE. The Signal_X may be detected by a plurality of eNBs in a synchronous network. In a synchronous network, a UE can access a target eNB without performing the random access channel (RACH) procedure since the uplink is synchronized. It should be noted that the communication between eNBs may be performed over the X2 and S1 interfaces. An S1 interface may be used to connect an eNB to the core network gateway. An X2 interface may be utilized to establish logical links between eNB nodes. The enhanced UE-controlled handover mechanism enables the UE to handover to a target eNB with the best overall qualities of the forward and reverse links.

Figure 8:
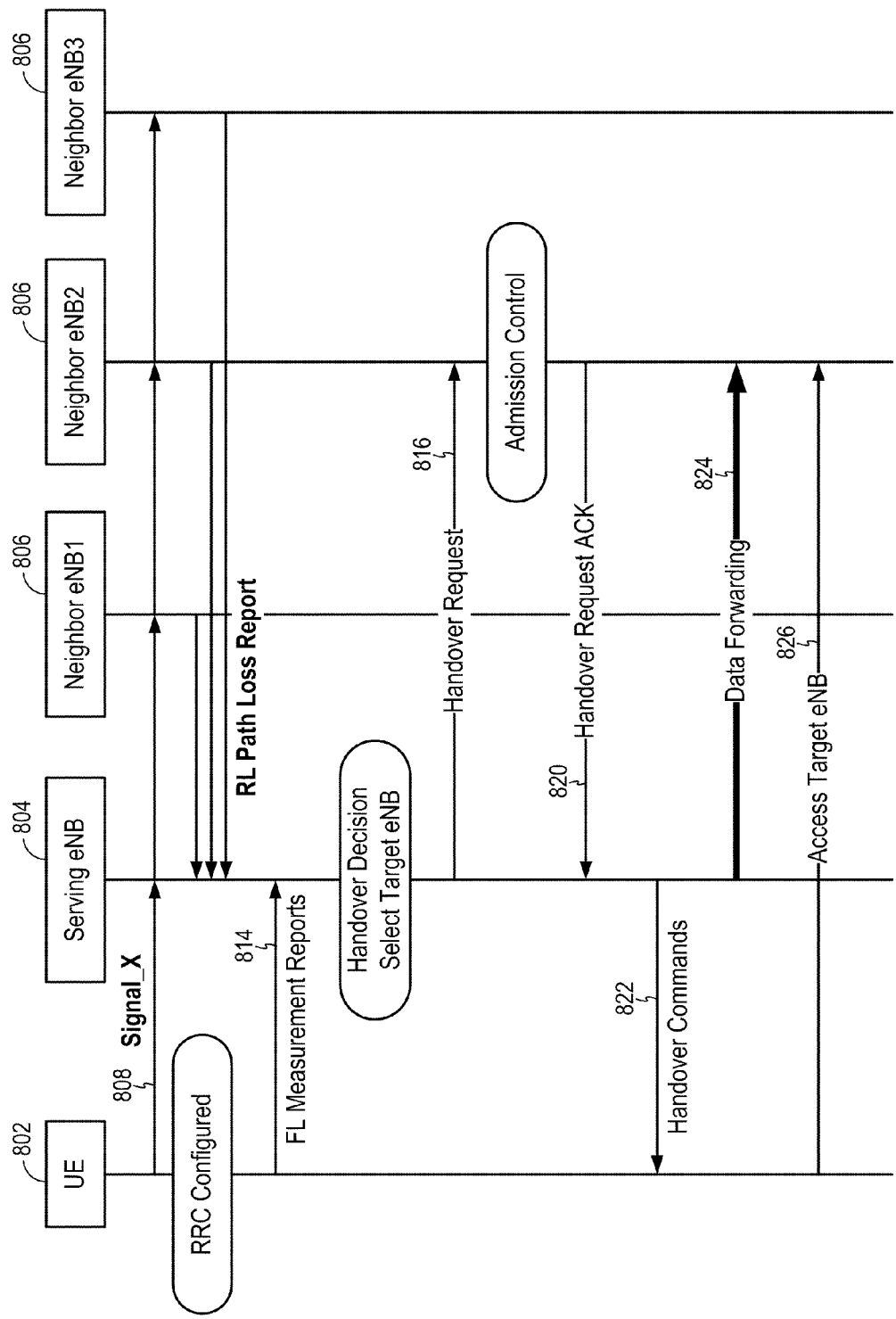
FIG. 8 illustrates an example flow diagram of an enhanced network-controlled handover, in accordance with certain aspects of the present disclosure.

FIG. 8 illustrates an example flow diagram of an enhanced network-controlled handover, in accordance with certain aspects of the present disclosure. A UE 802 sends a special signal, Signal_X 808, to all the neighboring eNBs that can hear this signal. The radio resource controller (RRC) may determine time of the transmission of Signal_X. Neighboring eNBs 806 that are able to detect Signal_X estimate their reverse link path loss values and report the estimated path loss values 812 to the serving eNB 804. The UE also forwards the FL measurements 814 to the serving eNB.

When the channel between the UE and the serving eNB deteriorates, the serving eNB selects one of the neighboring eNBs as a target eNB for handover. The target eNB is selected such that it has the best communication links to/from the UE based on the FL measurements at the UE and the RL path loss values received from the eNBs. After selecting the target eNB for handover, the serving eNB sends a request 816 to the target eNB 806 for handover of the UE. Upon receiving the request, the target eNB sends an acknowledgement 820 to the serving eNB. The serving eNB sends a handover command 822 to the UE and forwards the data 824 associated with the UE to the target eNB. The UE accesses 826 the target eNB and continues communicating with the target eNB. The enhanced network-controlled handover mechanism enables the UE to handover to a target eNB with the best overall qualities of the forward and reverse links.

Figure 6A:
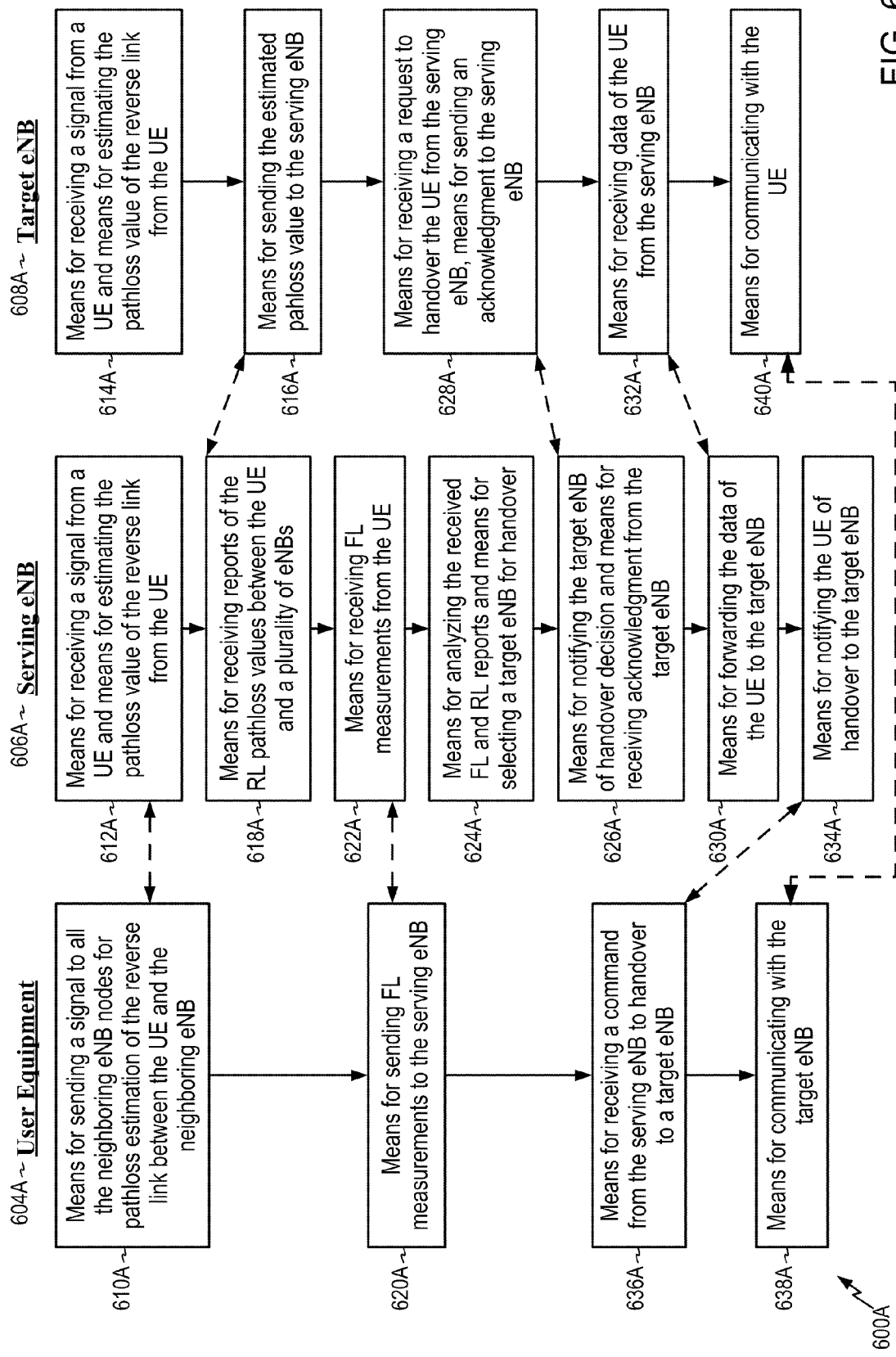
FIG. 6A illustrates example components capable of performing the operations illustrated in FIG. 6.

The various operations of methods described above may be performed by various hardware and/or software component(s) and/or module(s) corresponding to means-plus-function blocks illustrated in the Figures. For example, operations 500 and 600 illustrated in FIGS. 5 and 6 correspond to means-plus-function blocks 500A and 600A illustrated in FIGS. 5A and 6A.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to embodiments of the present disclosure, other and further embodiments of the disclosure may be devised without departing from the basic scope thereof, and the scope thereof is determined by the claims that follow.

The invention claimed is:

1. A method for wireless communications by a user equipment (UE), comprising:
   sending a signal from the UE to a plurality of neighboring evolved Node-Bs (eNBs), wherein the signal contains information indicative of an identity of the UE and is used for estimation of path loss in a reverse link (RL) between the UE and the neighboring eNBs, and wherein the signal is sent to the plurality of neighboring eNBs without performing a random access channel (RACH) procedure;
   receiving, from a serving eNB, values for RL path loss between the UE and the plurality of neighboring eNBs;
   making a decision to handover to a target eNB selected from the plurality of neighboring eNBs by analyzing the received RL path loss values and forward link measurements between the UE and the neighboring eNBs; and
   sending a notification regarding the decision to handover.

2. The method of claim 1, wherein sending the notification regarding the decision to handover comprises sending the notification regarding the handover decision to the target eNB.

3. A method for wireless communications by a serving evolved Node-B (eNB), comprising:
   estimating path loss value of a reverse link between a user equipment (UE) and the serving eNB based on a signal received from the UE;
   receiving forward link (FL) measurements of forward links between a plurality of neighboring eNBs and the UE from the UE;
   receiving path loss values of reverse links between the UE and the plurality of neighbor eNBs over at least one of an X2 interface or an S1 interface, wherein the path loss values of the reverse links are based on a signal sent from the UE to the plurality of neighboring eNBs that includes information indicative of an identity of the UE, wherein the FL measurements, estimated path loss value and received path loss values are used to make a decision to handover the UE from the serving eNB to one of the neighboring eNBs; and
   transmitting the estimated path loss value and the received path loss values to the UE, wherein the decision to handover the UE from the serving eNB to one of the neighboring eNBs is made at the UE.

4. An apparatus for wireless communications by a user equipment (UE), comprising:
   logic for sending a signal from the UE to a plurality of neighboring evolved Node-Bs (eNBs), wherein the signal contains information indicative of an identity of the UE and is used for estimation of path loss in a reverse link (RL) between the UE and the neighboring eNBs, and wherein the signal is sent to the plurality of neighboring eNBs without performing a random access channel (RACH) procedure;
   logic for receiving, from a serving eNB, values for RL path loss between the UE and the plurality of neighboring eNBs;
   logic for making a decision to handover to a target eNB selected from the plurality of neighboring eNBs by analyzing the received RL path loss values and forward link measurements between the UE and the neighboring eNBs; and
   logic for sending a notification regarding the decision to handover.

5. The apparatus of claim 4, wherein the logic for sending the notification regarding the decision to handover comprises logic for sending the notification regarding the handover decision to the target eNB.

6. An apparatus for wireless communications by a serving evolved Node-B (eNB), comprising:
   logic for estimating path loss value of a reverse link between a user equipment (UE) and the serving eNB based on a signal received from the UE;
   logic for receiving forward link (FL) measurements of forward links between a plurality of neighboring eNBs and the UE from the UE;
   logic for receiving path loss values of reverse links between the UE and the plurality of neighboring eNBs over at least one of an X2 interface or an S1 interface, wherein the path loss values of the reverse links are based on a signal sent from the UE to the plurality of neighboring eNBs that includes information indicative of an identity of the UE, wherein the FL measurements, estimated path loss value and received path loss values are used to make a decision to handover the UE from the serving eNB to one of the neighbor eNBs;
   logic for transmitting the estimated path loss value and received path loss values to the UE; and
   logic for receiving a notification from the UE regarding the decision to handover the UE from the serving eNB to one of the neighboring eNBs.

7. An apparatus for wireless communications by a user equipment (UE), comprising:
   means for sending a signal from the UE to a plurality of neighboring evolved Node-Bs (eNBs), wherein the signal contains information indicative of an identity of the UE and is used for estimation of path loss in a reverse link (RL) between the UE and the neighboring eNBs, and wherein the signal is sent to the plurality of neighboring eNBs without performing a random access channel (RACH) procedure;

means for receiving, from a serving eNB, values for RL path loss between the UE and the plurality of neighboring eNBs;

means for making a decision to handover to a target eNB selected from the plurality of neighboring eNBs by analyzing the received RL path loss values and forward link measurements between the UE and the neighboring eNBs; and means for sending a notification regarding the decision to handover.

8. An apparatus for wireless communications by a serving evolved Node-B (eNB), comprising:

means for estimating path loss value of a reverse link between a user equipment (UE) and the serving eNB based on a signal received from the UE;

means for receiving forward link (FL) measurements of forward links between a plurality of neighboring eNBs and the UE from the UE;

means for receiving path loss values of reverse links between the UE and the plurality of neighboring eNBs over at least one of an X2 interface or an S1 interface, wherein the path loss values of the reverse links are based on a signal sent from the UE to the plurality of neighboring eNBs that includes information indicative of an identity of the UE, wherein the FL measurements, estimated path loss value and received path loss values are used to make a decision to handover the UE from the serving eNB to one of the neighbor eNBs;

means for transmitting the estimated path loss value and received path loss values to the UE; and means for receiving a notification from the UE regarding the decision to handover the UE from the serving eNB to one of the neighboring eNBs.

9. A non-transitory computer-readable medium for wireless communications by a user equipment (UE), comprising a computer-program product having instructions stored thereon, the instructions being executable by one or more processors and the instructions comprising:

instructions for sending a signal from the UE to a plurality of neighboring evolved Node-Bs (eNBs), wherein the signal contains information indicative of an identity of the UE and is used for estimation of path loss in a reverse link (RL) between the UE and the neighboring eNBs, and wherein the signal is sent to the plurality of neighboring eNBs without performing a random access channel (RACH) procedure;

instructions for receiving, from a serving eNB values for RL path loss between the UE and the plurality of neighboring eNBs;

instructions for making a decision to handover to a target eNB selected from the plurality of neighboring eNBs by analyzing the received RL path loss values and forward link measurements between the UE and the neighboring eNBs; and instructions for sending a notification regarding the decision to handover.

10. A non-transitory computer-readable medium for wireless communications by a serving evolved Node-B (eNB), comprising a computer-program product having instructions stored thereon, the instructions being executable by one or more processors and the instructions comprising:

instructions for estimating path loss value of a reverse link between a user equipment (UE) and the serving eNB based on a signal received from the UE;

instructions for receiving forward link (FL) measurements of forward links between a plurality of neighboring eNBs and the UE from the UE;

instructions for receiving path loss values of reverse links between the UE and the plurality of neighboring eNBs over at least one of an X2 interface or an S1 interface, wherein the path loss values of the reverse links are based on a signal sent from the UE to the plurality of neighboring eNBs that includes information indicative of an identity of the UE, wherein the FL measurements, estimated path loss value and received path loss values are used to make a decision to handover the UE from the serving eNB to one of the neighbor eNBs;

instructions for transmitting the estimated path loss value and received path loss values to the UE; and instructions for receiving a notification from the UE regarding the decision to handover the UE from the serving eNB to one of the neighboring eNBs.

11. An apparatus for wireless communications by a user equipment (UE), comprising:

at least one processor configured to:
send a signal from the UE to a plurality of neighboring evolved Node-Bs (eNBs), wherein the signal contains information indicative of an identity of the UE and is used for estimation of path loss in a reverse link (RL) between the UE and the neighboring eNBs, and wherein the signal is sent to the plurality of neighboring eNBs without performing a random access channel (RACH) procedure;
receive, from a serving eNB, values for RL path loss between the UE and the plurality of neighboring eNBs;
make a decision to handover to a target eNB selected from the plurality of neighboring eNBs by analyzing the received RL path loss values and forward link measurements between the UE and the neighboring eNBs;
send a notification regarding the decision to handover; and
a memory coupled to the processor.

12. An apparatus for wireless communications by a serving evolved Node-B (eNB), comprising:

at least one processor configured to:
estimate path loss value of a reverse link between a user equipment (UE) and the serving eNB based on a signal received from the UE;
receive forward link (FL) measurements of forward links between a plurality of neighboring eNBs and the UE from the UE;
receive path loss values of reverse links between the UE and the plurality of neighboring eNBs over at least one of an X2 interface or an S1 interface, wherein the path loss values of the reverse links are based on a signal sent from the UE to the plurality of neighboring eNBs that includes information indicative of an identity of the UE, wherein the FL measurements, estimated path loss value and received path loss values are used to make a decision to handover the UE from the serving eNB to one of the neighbor eNBs;
transmit the estimated path loss value and received path loss values to the UE; and
receive a notification from the UE regarding the decision to handover the UE from the serving eNB to one of the neighboring eNBs; and
a memory coupled to the processor.

* * * * *